(No Model.) 2 Sheets—Sheet 2.
M. CRAWFORD, Jr.
STREET SWEEPER.
No. 512,161. Patented Jan. 2, 1894.
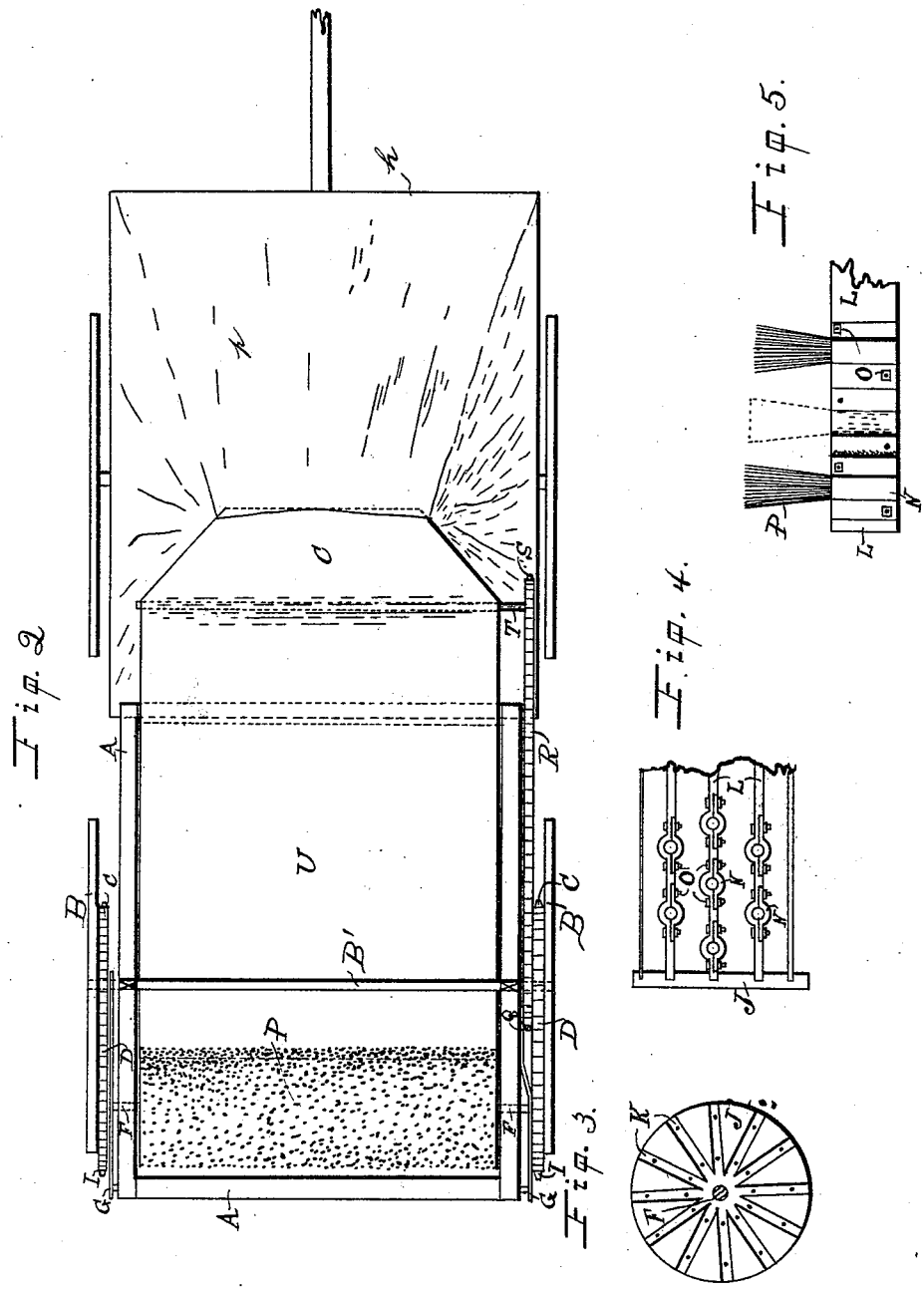
Witnesses
James T. Summerville
Molbry Haynes
Inventor
Morgan Crawford Jr.
By Joshua B. Webster
Attorney.

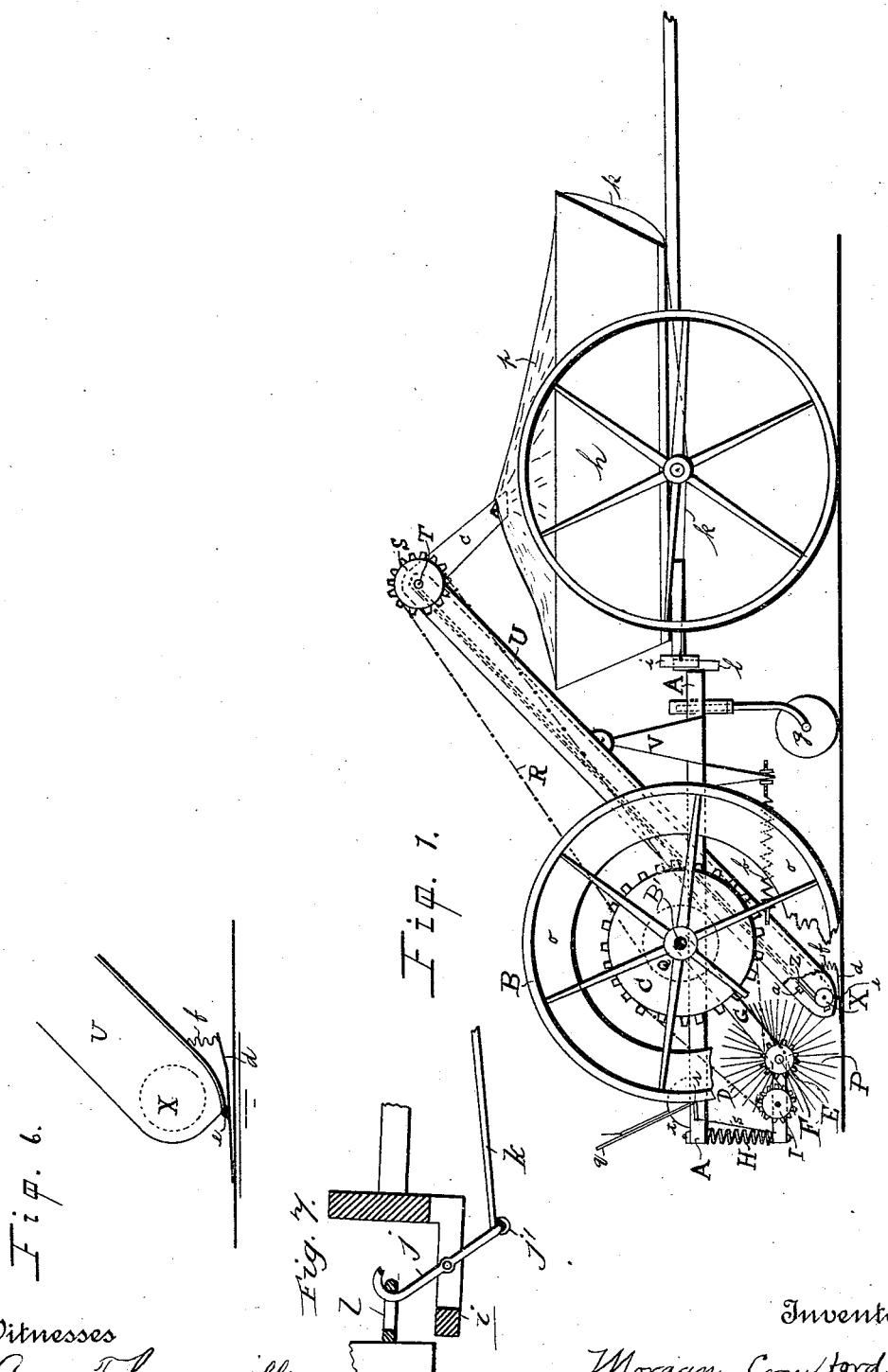

UNITED STATES PATENT OFFICE.

MORGAN CRAWFORD, JR., OF STOCKTON, CALIFORNIA.

STREET-SWEEPER.

SPECIFICATION forming part of Letters Patent No. 512,161, dated January 2, 1894.

Application filed April 27, 1893. Serial No. 472,073. (No model.)

*To all whom it may concern:*

Be it known that I, MORGAN CRAWFORD, Jr., a citizen of the United States, residing at Stockton, in the county of San Joaquin and State of California, have invented certain new and useful Improvements in Street-Sweepers; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to that class of street sweepers which simply and expeditiously collect the dirt, dust, and other refuse from the paved streets of cities and discharges the same into an accompanying dirt cart or vehicle.

It consists of a three wheeled vehicle which has a rotary broom in its rear and is attached behind a cart or wagon, a suitable system of sprocket wheels and chain belts operating the different parts consisting of the broom aforesaid, an elevator provided with a spout and an endless apron having slats, trays or pans, upon which the broom discharges, also of such other devices and combination of devices as will be more fully described in the specification and pointed out in the claims.

Referring to the accompanying drawings,—Figure 1, is a right hand side elevation of my improved street sweeper (part of one of the wheels and the elevator broken away) the same being attached to a cart or wagon. Fig. 2, is a plan view of the same. Fig. 3, is a detached front view of one of the end plates of the broom. Fig. 4, is a detached view of a part of the skeleton of my broom with the broom material withdrawn. Fig. 5, is a detached side view of one of the sections of the broom showing the manner in which the broom material is placed in position. Fig. 6, is a detached side elevation of the bottom end of the elevator, showing shoe under the same. Fig. 7, is a detail, horizontal section of the coupling device.

Similar letters of reference indicate corresponding parts.

A, is the main frame mounted upon suitable wheels B, and its axle B'.

C, are sprocket wheels attached to the spokes of the wheels B, and engaging with sprocket chains D, which engage with sprocket wheels E, which are attached to the ends of a broom shaft F, which is supported by radial arms G, which are pivotally attached to and extend rearwardly from the main wheel axle, and are slightly depressed, and at their outer ends are suspended from and supported by any desired number of spiral springs H, which at their upper ends are attached to the rear of the frame A. The sprocket chains D, are provided with tightening wheels I.

The broom shaft F, near its ends is provided with a metal plate J, provided with grooves K upon its face, into which grooves are inserted metal bars L, of the form as will be shown and which are held in position by pins or screws.

The bars L, are provided with sockets which are formed in part by an indentation in one side of the said bar L, and in part by a cap N, which is secured to the side of the bar L, by bolts O. Into these sockets is inserted the broom material P.

Attached to one of the sprocket wheels C, is a sprocket wheel Q, which engages with a sprocket chain R, which extends upward and forward and engages with a sprocket wheel S, which is attached to one end of an elevator shaft T, which is situated at the upper end of the inclined elevator U, which is pivoted on suitable standards V, attached near the front of the frame A. At the lower end of the elevator is located a roller X, around which an endless apron Z, travels. This apron is driven by the shaft T, and it is provided with slats, cups, or trays as *a*. The elevator which consists of the apron Z, and an inclosing case surrounding the same is held in close proximity to the pavement by means of one or more spiral springs, *b*. The upper end of the elevator is provided with a spout, *c*.

The bottom end of the elevator is provided with a shoe, *d*, pivoted at the point, *e*, and provided with a spiral spring, *f* for the purpose of maintaining the shoe on the ground, thus preventing the dust and dirt from being thrown under the same.

A swivel wheel, *g*, is located near the front end of the frame A for the purpose of supporting the front end of the same.

*h*, indicates the body of a cart or wagon which is designed to receive the sweepings from the elevator spout C.

Inasmuch as it is desirable to use a number of carts in conjunction with a single sweeper, I have provided a coupling (better illustrated in Fig. 7), whereby a cart may be readily connected to and as readily disconnected from the sweeper frame. This coupling comprises a vertically-disposed loop $l$, which is rigidly connected to the sweeper frame, an angular plate $i$, which is connected to the rear of the cart body, a hook $j$, which is carried by the plate $i$, and is designed to engage the loop $l$, and a cord $k$, which is connected to the outer end $j'$, of the hook. By the provision of the cord $k$, which extends to the front of the cart, the driver may disconnect the cart from the sweeper frame, without leaving his seat; it being simply necessary to back the cart so as to carry the hook out of engagement with the loop $l$, and pull upon the cord so as to move the engaging end of the hook out of line with the loop.

$o$, is an envelope of suitable material covering a portion of the spokes of the wheels B, for the purpose of preventing the refuse matter from escaping.

$p$, is a covering over the cart, to prevent any dust from escaping from the cart when deposited therein.

When it is desired to transport my improved street sweeper from place to place, the broom is raised by means of a lever, $q$, which is fulcrumed at the point, $r$, near the rear of the main frame, and is provided with a rod or chain, $s$, which is attached at its upper end to the lever, $q$, and at its lower end to the rear end of the radial arms G.

$t$, is a segment rack for the purpose of maintaining the lever, $q$, in any desired position.

Having thus described my invention, what I claim as new, and desire to secure by Letters Patent, is—

1. In a street sweeping machine, a suitable main frame, wheels and axle, the arms G, pivotally attached to the axle, the broom shaft F, attached to the arms G, and connected by gearing mechanism with the axle, the supporting spiral springs H, attached at their lower ends to the arms G and at their upper ends to the rear of the main frame, a suitable broom attached to the broom shaft F, and the elevator U pivoted on the standards V, attached near the front of the main frame, such elevator frame being provided with a suitable apron and operating mechanism, all substantially as shown and described.

2. In a street sweeping machine, the combination of the machine frame, a cart or wagon, a vertically-disposed loop $l$, connected to the machine frame, the vertically-disposed angular plate $i$, connected to the cart or wagon, the hook $j$, carried by said plate and adapted to engage the loop $l$, of the machine, and a cord connected to the outer end of the hook, all substantially as specified.

In testimony whereof I affix my signature in presence of two witnesses.

MORGAN CRAWFORD, JR.

Witnesses:
JOSHUA B. WEBSTER,
MALBRY HAYNES.